(12) United States Patent
Schwoerer et al.

(10) Patent No.: US 11,052,886 B2
(45) Date of Patent: Jul. 6, 2021

(54) HYDRAULIC BRAKE SYSTEM WITH MAKE-UP LINE

(71) Applicant: Caterpillar Inc., Peoria, IL (US)

(72) Inventors: Brandon J. Schwoerer, Washington, IL (US); Lance M. Cowper, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 86 days.

(21) Appl. No.: 16/577,720

(22) Filed: Sep. 20, 2019

(65) Prior Publication Data

US 2021/0086738 A1    Mar. 25, 2021

(51) Int. Cl.
| | |
|---|---|
| *B60T 8/48* | (2006.01) |
| *B60T 8/34* | (2006.01) |
| *B60T 8/40* | (2006.01) |
| *B60T 17/04* | (2006.01) |
| *B60T 13/16* | (2006.01) |

(52) U.S. Cl.
CPC ............ *B60T 8/341* (2013.01); *B60T 8/40* (2013.01); *B60T 8/4827* (2013.01); *B60T 13/16* (2013.01); *B60T 17/04* (2013.01)

(58) Field of Classification Search
CPC .......... B60T 8/341; B60T 8/40; B60T 8/4827; B60T 13/16; B60T 17/04
See application file for complete search history.

(56) References Cited

U.S. PATENT DOCUMENTS

| | | | | |
|---|---|---|---|---|
| 4,458,791 A | * | 7/1984 | Schneider | ............. B60T 13/141 188/170 |
| 5,246,280 A | | 9/1993 | Sigl | |
| 5,882,090 A | * | 3/1999 | Ganzel | ................... B60T 8/341 303/113.2 |
| 5,884,985 A | * | 3/1999 | Ganzel | .................. B60T 8/4275 303/113.2 |
| 6,149,250 A | | 11/2000 | Steffes et al. | |
| 6,336,688 B1 | | 1/2002 | Nakayasu | |
| 6,641,230 B2 | * | 11/2003 | Gegalski | ................. B60T 8/363 303/113.2 |
| 8,615,992 B2 | * | 12/2013 | Naito | .................... E02F 9/2083 60/442 |
| 2010/0187900 A1 | | 7/2010 | Remmelmann | |
| 2017/0210372 A1 | | 7/2017 | Feigel | |

FOREIGN PATENT DOCUMENTS

RU        2090398 C1    9/1997

* cited by examiner

*Primary Examiner* — Thomas W Irvin
(74) *Attorney, Agent, or Firm* — von Briesen & Roper, s.c.

(57) ABSTRACT

A hydraulic brake system is disclosed which may include a supply pump pressurizing a brake control system via a brake control supply line; a pressure-released brake connected to the brake control system via a brake line; a pressure relief valve with an inlet connected to the brake control supply line and an outlet connected to a relief valve discharge line; a make-up line connecting the brake line and the relief valve discharge line; and a check valve on the make-up line allowing one-way flow from the relief valve discharge line to the brake line.

20 Claims, 6 Drawing Sheets

HYDRAULIC BRAKE SYSTEM WITH MAKE-UP LINE

TECHNICAL FIELD

The present disclosure relates generally to brakes and, more specifically, relates to hydraulic brake systems.

BACKGROUND

Work machines such as excavators, bulldozers, motor graders and similar machines have many of the same components and controls as modern automobiles. For example, both automobiles and industrial machines have a chassis, an engine, and a place for an operator. The operator manipulates such machine using controls like steering wheels, brake systems, etc. In work machines, several types of brake systems are possible, including pneumatic and hydraulic. The present disclosure relates to a hydraulic brake system.

Many hydraulic brake systems include pressure-released brakes which disengage when a set pressure is present in the brake line. However, in hydraulic brake systems with a pressure-released brake, a problem may exist wherein small amounts of brake fluid are lost through brake piston seal leaks when the brakes are engaged. This can result in a "voided" brake line which lacks sufficient oil volume to release the brakes. As a result, there may be a delay between the brake pedal being lifted and the actual brakes releasing as the pressure must build back up in the system. In some cases, when the operator has pressed on the accelerator, this can cause lurching of the machine and less than optimal performance.

The prior art has failed to adequately address this issue. U.S. Pat. No. 6,336,688 to Nakayasu discloses an anti-lock brake system with a check valve on a bypass connected to a brake line. However, Nakayasu is directed toward rapidly applying anti-lock brakes, rather than releasing pressure-released brakes promptly. As a result, the Nakayasu system fails to correct the problem of a delayed release of brakes.

SUMMARY OF THE DISCLOSURE

According to one aspect of the disclosure, a hydraulic braking system is disclosed. The hydraulic braking system may be made up of the following components: a brake fluid supply pump with an outlet side pressurizing a brake control system via a brake control supply line; a pressure-released brake connected to the brake control system via a brake line, a pressure relief valve with an inlet connected to the brake control supply line and an outlet connected to a relief valve discharge line, a make-up line connecting the relief valve discharge line to the individual brake line; and a check valve on the make-up line allowing one-way flow from the relief valve discharge line to the individual brake line.

According to another aspect of the disclosure, a machine with a hydraulic brake system is disclosed. The machine may include an undercarriage, an engine, traction devices, and a hydraulic brake system made up of the following components: a brake fluid supply pump with an outlet side pressurizing a brake control system via a brake control supply line; a pressure-released brake connected to the brake control system via a brake line, a pressure relief valve with an inlet connected to the brake control supply line and an outlet connected to a relief valve discharge line, a make-up line connecting the relief valve discharge line to the individual brake line; and a check valve on the make-up line allowing one-way flow from the relief valve discharge line to the individual brake line.

According to yet another aspect of the disclosure, a method for using hydraulic brakes is disclosed. The method may comprise: activating a brake control system; de-pressurizing a brake line; engaging a pressure-released brake, losing brake fluid; replenishing lost brake fluid by communicating brake fluid through a make-up line connected to a relief valve discharge line; de-activating the brake control system; pressurizing the brake line; releasing the brake.

These and other aspects and features of the present disclosure will be more readily understood after reading the following detailed description in conjunction with the accompanying drawings.

DETAILED DESCRIPTION

Figure 1:
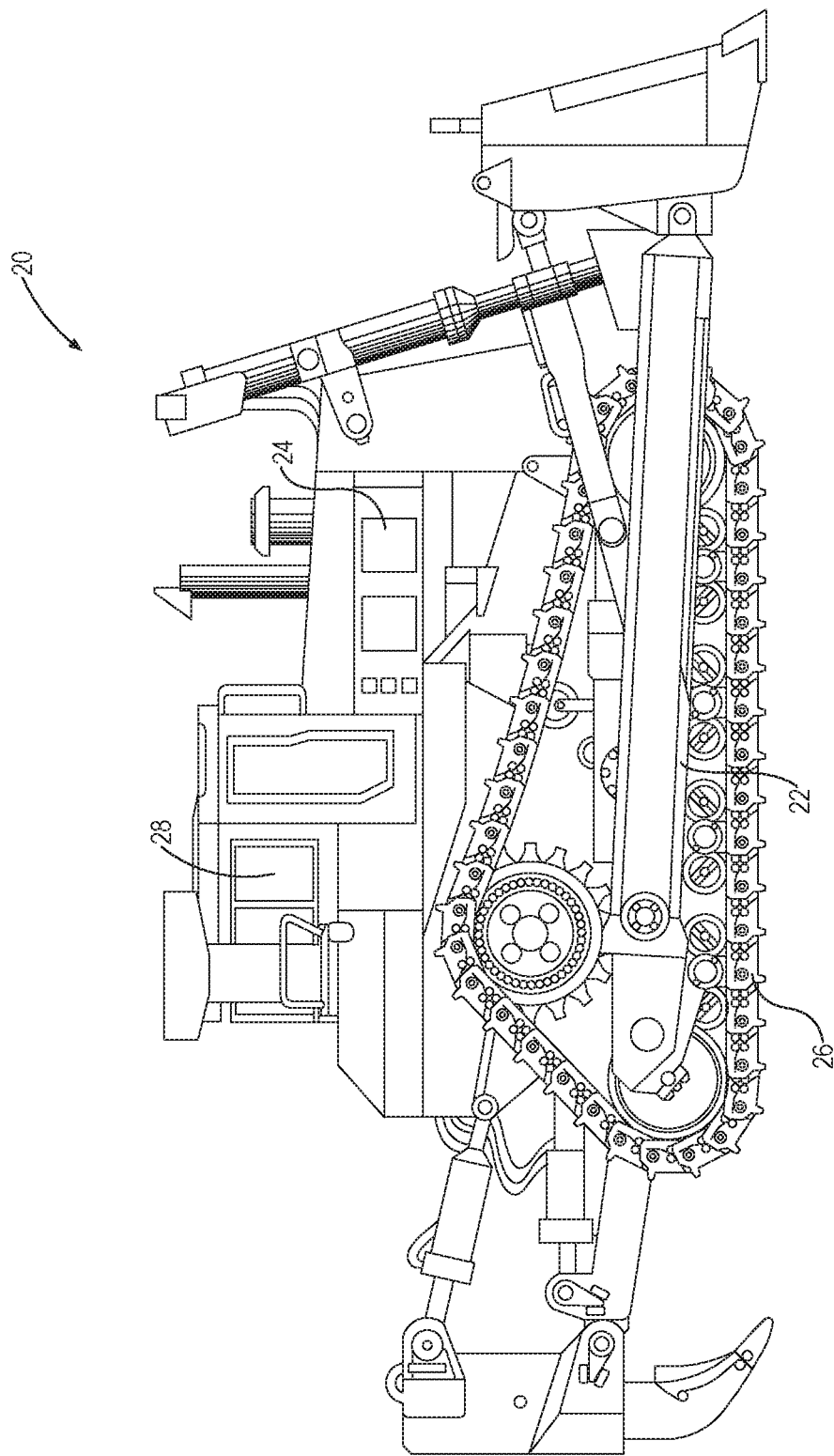
FIG. 1 is a perspective view of an overall work machine in accordance with the present disclosure.

Referring now to the drawings, and with specific reference to FIG. 1, FIG. 1 depicts an example of a typical work machine 20. The work machine 20 may be a large mining truck, bulldozer, excavator, tractor, or the like. Using the bulldozer shown in FIG. 1 only as an example, the work machine 20 includes an undercarriage 22, an engine 24 attached to the undercarriage 22, and at least one traction device 26 that supports the undercarriage 22 and is powered by the engine 24. The traction device 26 may be wheels, treads, or the like which serve to enable the work machine to engage the ground and move. The work machine 20 may be controlled by an operator located within the operator cabin 28. The work machine has a hydraulic brake system connected to the traction device 26.

Figure 2:
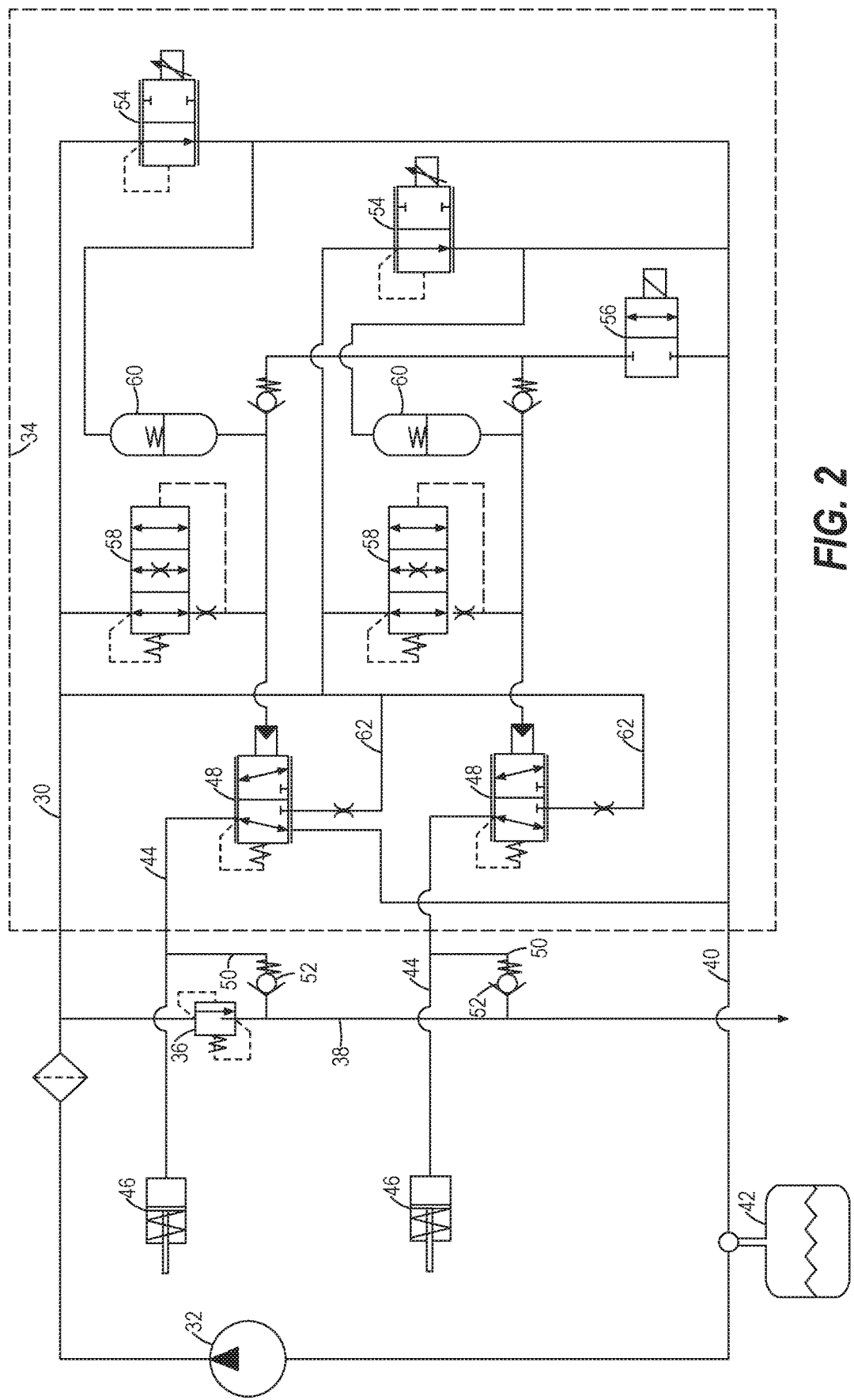
FIG. 2 is a schematic representation of an exemplary brake control system according to the present disclosure.

Referring now to FIG. 2, a schematic of one embodiment of a hydraulic brake system is depicted. In this embodiment, the system includes: a brake control supply line 30 connecting the pressurized outlet of a supply pump 32 to a brake control system 34, a pressure relief valve 36 with an inlet connected to the brake control supply line 30, a relief valve discharge line 38 connected to the outlet of the pressure relief valve 36, a drain line 40 to a storage tank 42 connected to the brake control system 34, and at least one of each of the following: a brake line 44 connecting a pressure-released brake 46 and a three-way valve 48, a make-up line 50 connecting the relief valve discharge line 38 and the brake line 44, and a check valve 52 on the make-up line 50 that allows one-way flow from the relief valve discharge line 38 to the brake line 44.

The brakes 46 may be spring-activated pressure-released brakes such that increased pressure in the brake lines 44 releases the brakes and decreased pressure allows a spring to engage the brakes.

The brake control system 34 may include at least one proportional brake control valve 54 activated by a brake pedal (not shown) and a three-way valve 48 controlled by the brake control valve 54. The brake control system may also include a parking brake valve 56, and restrictor valves 58 and accumulators 60 allowing smoother brake activation. The brake control valves 54 may be directly, or remotely activated by the brake pedal.

The check valve 52 may be a spring-biased check valve. The check valve 52 can be manufactured or set to open at any desired pressure, but in one embodiment, the check valve 52 may open at 34 kPa.

The pressure relief valve 36 may be set to open at any desired pressure, but in one embodiment, the pressure relief valve may open at 2900 kPa. In one embodiment, the pressure in the relief valve discharge line 38 may be about 275 kPa.

Of course, other pressures, and ranges of pressures may be used, as well as other types of valves or additional valves and/or orifices in tandem with the present disclosure.

The three-way valve 48 is activated from a neutral position to an active position via fluid connection from the brake control valve 54 to a signal port of the three-way valve 48 which controls the valve's position. In the neutral position, the valve allows flow from the corresponding brake line 44 to the drain line 40. In the active position, the valve allow flow between the corresponding brake line 44 and a high-pressure line 62 connected to the brake control supply line 30. The three-way valve 48 may be a piloted three-way spool valve.

Figure 3:
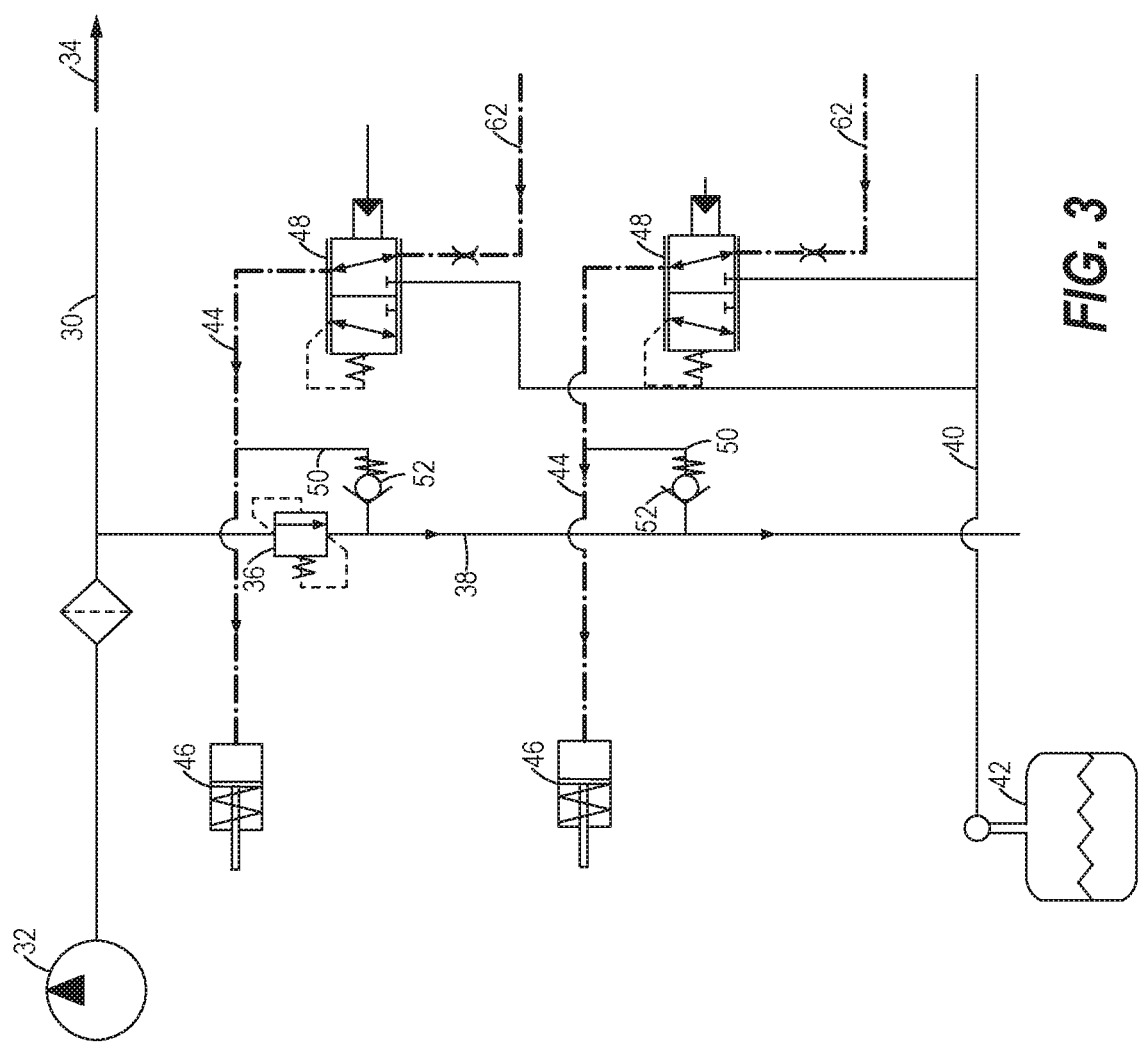
FIG. 3 is an enlarged schematic representation of a section of FIG. 1 showing the exemplary brake control system with the brakes not engaged.

FIG. 3 shows the system when the brakes are not engaged. When the brakes 46 are not engaged, each brake control valve 54 is in an closed position, allowing flow to the signal port of the corresponding three-way valve 48. Each of the three-way valves 48 is therefore in an active position. The active position allows flow from the high-pressure lines 62 to the corresponding brake line 44. The pressure in the brake lines 44 is higher than the pressure in the relief valve discharge lines 38 and sufficient to maintain the brakes 46 in a released position. The check valves 52 in the make-up lines 50 prevent flow from the individual brake lines 44 to the relief valve discharge line 38.

In one embodiment, the pressure in the brake line may be between about 2530-2870 kPa when the brakes are not engaged. Of course, other pressures, and ranges of pressures may be used.

Figure 4:
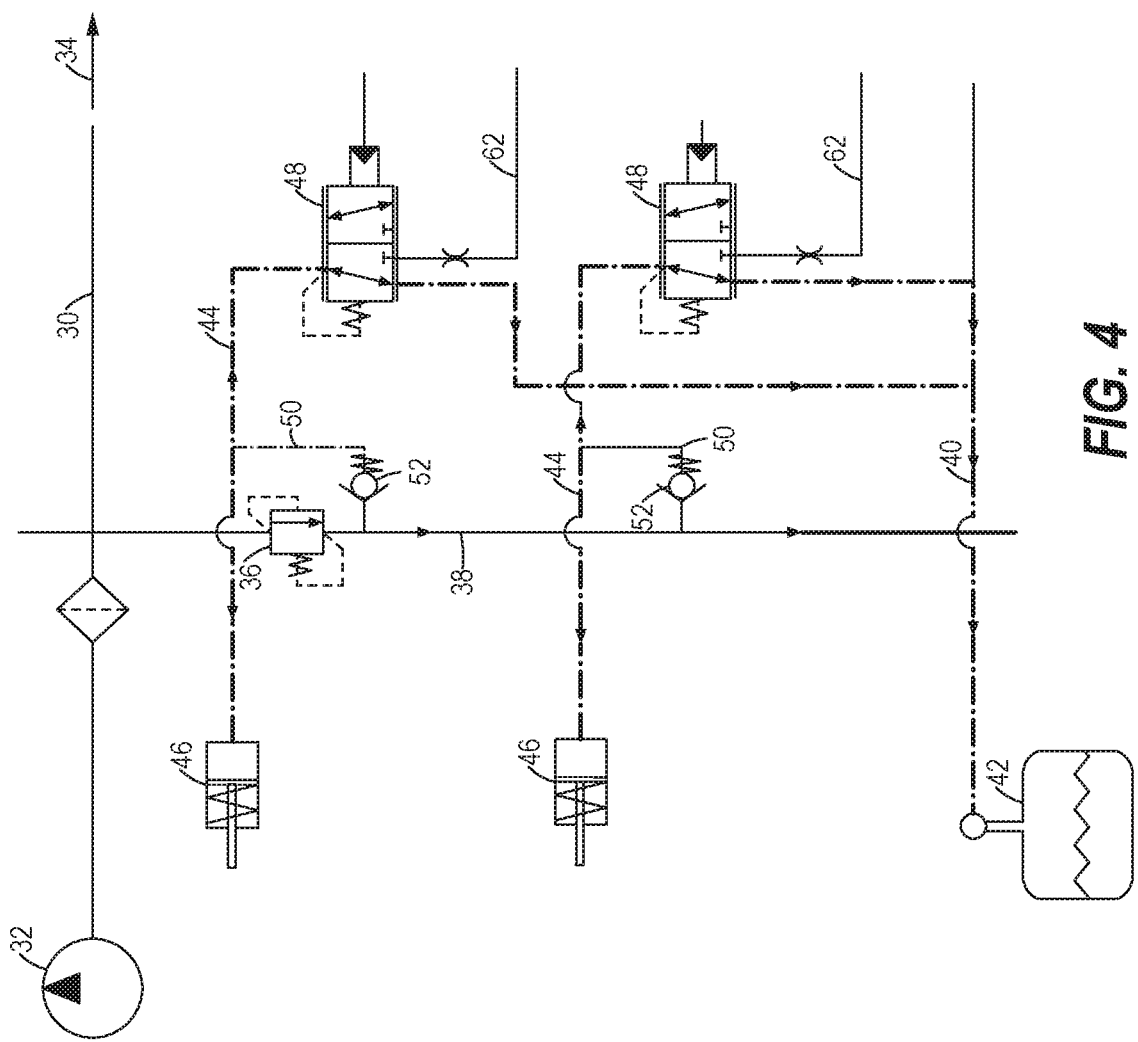
FIG. 4 is an enlarged schematic representation similar to FIG. 3 but with the brakes engaged.

FIG. 4 depicts the system with the three-way valves 48 in neutral position and the brakes engaged. As shown in FIG. 4, in the neutral position, the three-way valves 48 permit flow from the brake lines 44 to the drain line 40. This reduces the pressure in the brake lines 44, 112 and allows the brakes 46 to engage 114.

In one embodiment, the pressure in the brake line may be between about 0-70 kPa when the brakes are engaged. Of course, other pressures, and ranges of pressures may be used.

When the brakes 46 are engaged, some portion of brake fluid may be lost via the brakes 46, 116. This may occur most commonly through brake piston seal leakage. In one embodiment, seal leakage may allow a fluid loss of up to about 0.25 liters per minute. In a typical scenario, a machine that has been sitting with brakes engaged overnight could have a significant amount of brake fluid lost which would cause a problem upon starting the machine for the day. Another mechanism by which brake fluid may be lost from spring-applied brakes is brake application overshoot, in which the spring pushes the brake back too far or too fast and squeezes additional brake fluid through the brake piston seals.

This lost brake fluid can be made up through the make-up line 50, 118. In one embodiment, the flow of brake fluid through the check valve 52 may be up to about 1.5 liters per minute, depending on the amount of brake fluid lost.

In various embodiments, the delay may be improved from 800-900 ms to about 200 ms in light braking conditions.

INDUSTRIAL APPLICABILITY

In hydraulic brake systems with a pressure-released brake, a problem exists wherein small amounts of brake fluid are lost through the brake piston seal via leaks or other mechanisms. This can result in an "voided" brake line which lacks sufficient oil volume to release the brakes. As a result, there may be a delay between the brake pedal being lifted and the actual brakes releasing as the pressure must build back up in the system. In some cases, when the operator has pressed on the accelerator, this can cause lurching of the machine and potentially less than optimum performance The disclosed device is unique when compared with other known devices and solutions because, among other things, it provides a mechanical solution to a mechanical problem. The disclosed device is structurally different from other known devices or solutions. More specifically, the device is unique due to the presence of make-up lines connecting the relief valve discharge line and the individual brake lines, and a check valve on each make-up line that allows flow from the relief valve discharge line to the corresponding individual brake line.

In general, the teachings of the present disclosure may find applicability in various different work machine applications, including but not limited to industrial vehicles. For example, the brake system may be used on an excavator, bulldozer, tractor, or similar machines used in industries such as construction, mining, agriculture, and the like. The make-up line may be implemented in any hydraulic brake system with pressure released brakes, including spring-activated pressure-released brakes. The present disclosure may also be implemented in a system with wet pressure-applied brakes.

When the brakes 46 are not engaged, the system is in a configuration in which the three-way valve 48 is activated and allows high pressure flow from the brake control supply line 30 to the brake lines 44 through the high-pressure lines 62. The pressure in the brake lines 44 is higher than the pressure in the relief valve discharge line 38 and the check valves 52 ensure there is no flow through the make-up line 50.

Figure 5:
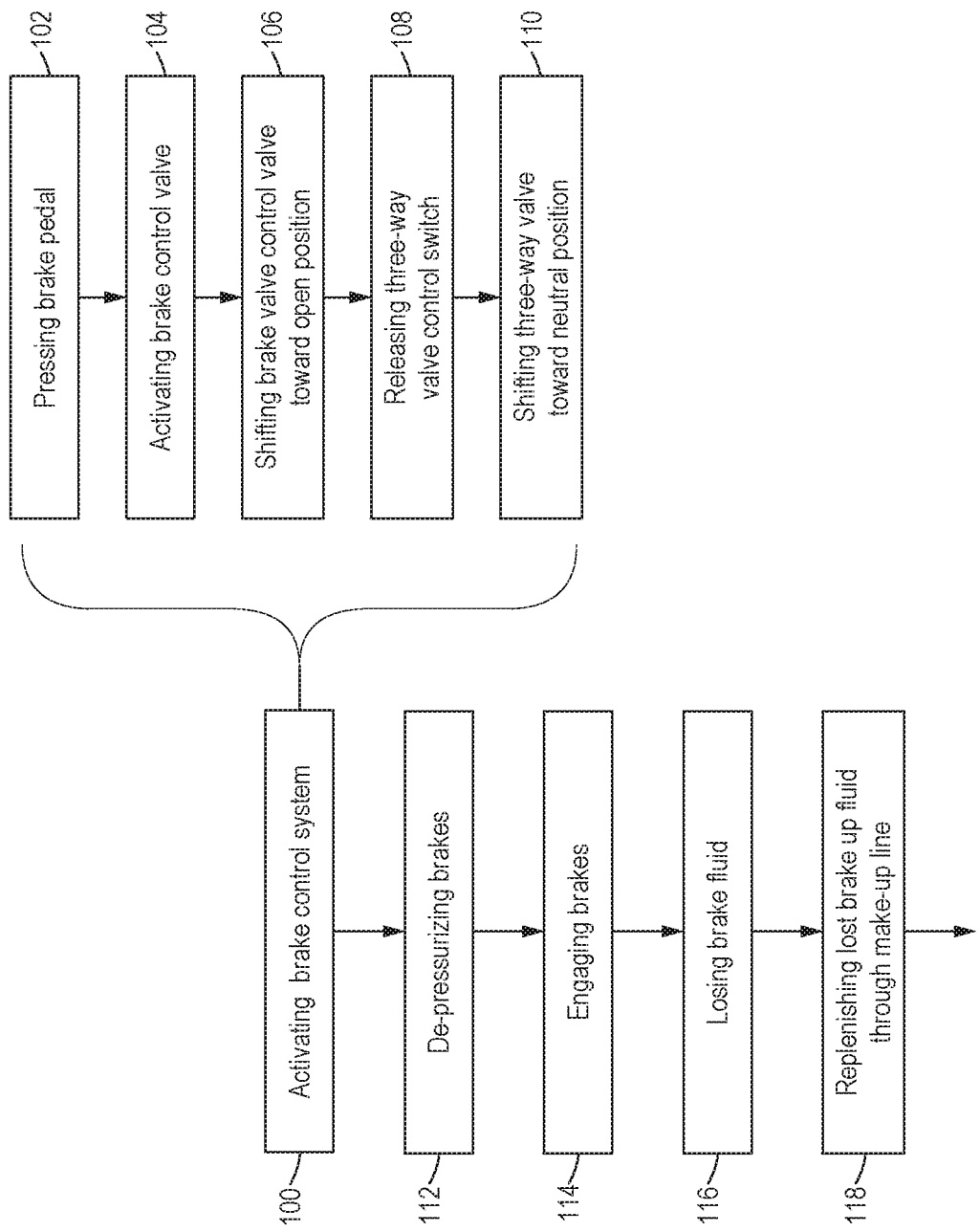
FIG. 5 is a flowchart depicting a sample sequence of steps that may be undertaken to engage the brakes according to the method of the present disclosure.

Referring now to FIG. 5, FIG. 5 depicts a flowchart of the steps necessary to engage the brakes 46. To engage the brakes, an operator activates the brake control system 100. Activating the brake control system further comprises several sub-steps. First, the operator presses on a brake pedal 102. This activates the brake control valves 54, 104. The activation may be directly mechanical or remotely via software. The brake control valves 54 are proportional valves which move relative to the amount of movement of the brake pedal. When activated, the brake control valves 54 move from a closed position towards an open position 106. This reduces the pressure at the signal port of the three-way valve 48, 108, and the three-way valves 48 switch from the active position to the neutral position 110.

When the brakes 46 are engaged, some brake fluid may be lost via one or more brake piston seals 46, 116. In this case, the pressure in the corresponding brake line 44 could be reduced. When this occurs, additional make-up flow is provided through the make-up line 50 as the check valve 52 allows flow from the relief valve discharge line 38, 118. This prevents any delay in releasing the brakes 46 caused by having to refill the missing oil before the required release pressure is present.

Figure 6:
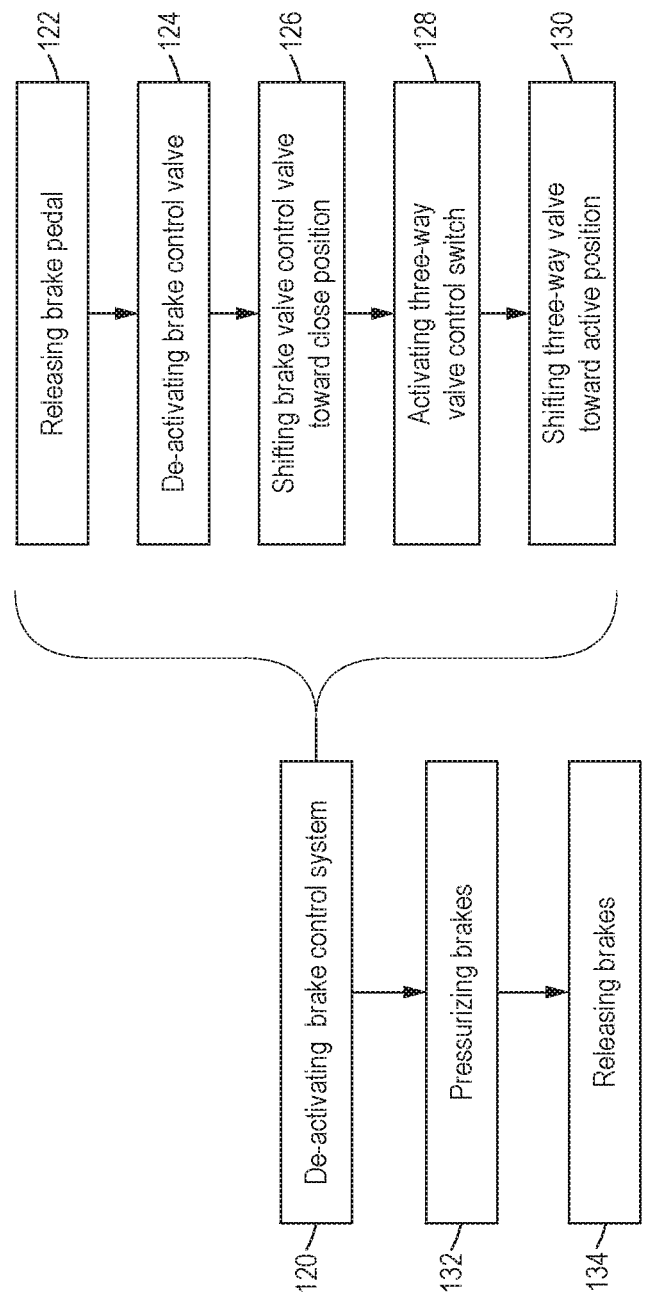
FIG. 6 is a flowchart depicting a sample sequence of steps that may be undertaken to release the brakes according to the method of the present disclosure.

Referring now to FIG. 6, FIG. 6 depicts a flowchart of the steps necessary to release the brakes 46. When the operator releases the brake pedal 120, the brake control valves 54 close 126 and the three-way valves 48 shift from the neutral position to the active position 130. The brake lines 44 no longer drain to the drain line 40 and instead the pressure in the brake lines 44 increases 132 from flow from the high-pressure lines 62. The increased pressure releases the brakes 46, 134. Because of the flow through the make-up line 50 while the brakes 46 were engaged, there is less delay in the release.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. A hydraulic brake system comprising:
   a supply pump having a pressurized supply pump outlet, the outlet connected to a brake control system via a brake control supply line;
   a pressure-released brake connected to the brake control system via a brake line;
   a pressure relief valve having an inlet and an outlet, the inlet connected to the brake control supply line, and the outlet connected to a relief valve discharge line;
   a make-up line connecting the brake line and the relief valve discharge line; and
   a check valve on the make-up line allowing one-way flow from the relief valve discharge line to the brake line.

2. The hydraulic brake system of claim 1, wherein the check valve is a spring biased check valve.

3. The hydraulic brake system of claim 2, wherein the check valve opens at 34 kPa.

4. The hydraulic brake system of claim 1, wherein the brake is a spring-activated pressure-released brake.

5. The hydraulic brake system of claim 1, wherein the pressure in the relief valve discharge line is higher than the pressure in the brake line while the brakes are engaged.

6. A machine comprising:
   an undercarriage;
   an engine mounted on the undercarriage;
   at least one traction device supporting the undercarriage and powered by the engine; and
   a hydraulic brake system connected to the traction device, including a supply pump having a pressurized supply pump outlet, the outlet connected to a brake control system via a brake control supply line; a pressure-released brake connected to the brake control system via a brake line; a pressure relief valve having an inlet and an outlet, the inlet connected to the brake control supply line, and the outlet connected to a relief valve discharge line; a make-up line connecting the brake line and the relief valve discharge line; and a check valve on the make-up line allowing one-way flow from the relief valve discharge line to the brake line.

7. The machine of claim 6, wherein the check valve is a spring biased check valve.

8. The machine of claim 7, wherein the check valve opens at 34 kPa.

9. The machine of claim 6, wherein the brake is a spring-activated pressure-released brake.

10. The machine of claim 6, wherein the pressure in the relief valve discharge line is higher than the pressure in the brake line while the brakes are engaged.

11. A method for using hydraulic brakes comprising:
    activating a brake control system;
    de-pressurizing a brake line;
    engaging a pressure-released brake
    losing brake fluid;
    replenishing lost brake fluid by communicating brake fluid through a make-up line connected to a relief valve discharge line;
    de-activating the brake control system;
    pressurizing the brake line;
    releasing the brake.

12. The method of claim 11, wherein a check valve in the make-up line prevents flow from the brake line to the relief valve discharge line.

13. The method of claim 12, wherein the check valve is a spring-biased check valve.

14. The method of claim 13, wherein the check valve opens at 34 kPa.

15. The method of claim 11, wherein the pressure in the relief valve discharge line is lower than the pressure in the brake line when the brakes are not engaged.

16. The method of claim 11, wherein the pressure in the relief valve discharge line is higher than the pressure in the brake line when the brakes are engaged.

17. The method of claim 11, wherein the pressure in the relief valve discharge line is about 275 kPa.

18. The method of claim 11, wherein the pressure in the brake line is about 2530-2870 kPa when the brakes are not engaged.

19. The method of claim 11, wherein the pressure in the brake line is about 0-70 kPa when the brakes are not engaged.

20. The method of claim 11, wherein the brake line is depressurized and pressurized by a three-way valve connected to the brake control supply line and a drain line.

* * * * *